Patented Dec. 21, 1943

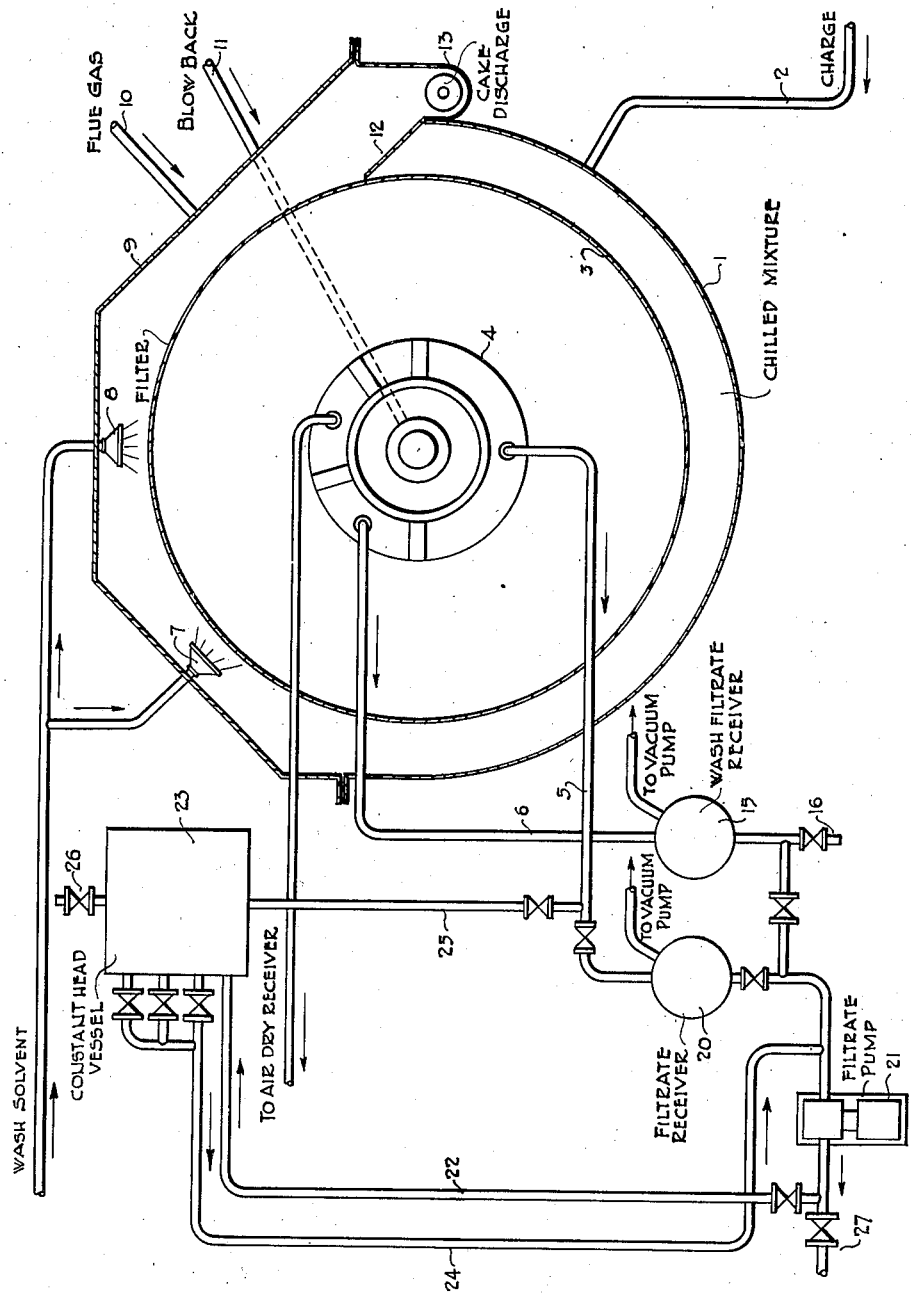

2,337,385

UNITED STATES PATENT OFFICE 2,337,385

DEWAXING HYDROCARBON OIL

Howard H. Gross, Fishkill, N. Y., assignor, by mesne assignments, to The Texas Company, New York, N. Y., a corporation of Delaware Application February 24, 1941, Serial No. 380,193

4 Claims. (Cl. 196—18)

This invention relates to dewaxing hydrocarbon oil by filtration and particularly to the dewaxing of wax-bearing mineral lubricating oils from which wax is precipitated in relatively voluminous form, or from which relatively thick filter cakes of wax are formed rather quickly.

The invention broadly contemplates dewaxing with a continuous type of filter, advantageously of the rotary type, and controlling the thickness of the filter cake by reducing substantially the differential in pressure existing through the filter surface during submergence of the filter surface within the wax-bearing mixture undergoing filtration.

More specifically, the invention contemplates discharging the filtrate from the filter against a substantial static head of fluid sufficient to maintain a substantial plus pressure of liquid within the interior of the filter element during its submergence in the wax-bearing mixture which is undergoing filtration.

The filter may, for example, comprise a hollow rotating cylinder or comprise hollow rotating leaves with means for either creating vacuum within the interior of the filter element, or for exerting positive pressure upon the exterior thereof.

The invention has particular application to a continuous vacuum filter wherein a rotating cylindrical filter surface is partially submerged in the filtering mixture, the submergence being about 50 to 60% of the filtering surface. Solids are deposited on the submerged portion of the surface to form a cake while liquid flows through the surface into the interior of the cylinder from which it is withdrawn as filtrate. As the cylinder rotates the filter surface, with cake deposited upon it, emerges from the filtering mixture. When the filter surface emerges the filter cake is exposed and is washed by applying solvent liquid to the surface of the cake, preferably in the form of a spray. The wash solvent, together with oil displaced by it, is drawn through the cake and filter cloth into the interior of the cylinder for removal. Upon continued rotation the filter cake is subjected to drying by the passage through it of gas. The cake is removed, usually by applying a slight reverse pressure to the interior of the filter element, causing distension of the fabric and consequent loosening of the cake, complete removal of which is facilitated by suitable scraping means located adjacent to the exterior surface of the filter fabric.

When dewaxing oil from which the wax is precipitated in voluminous form a thick filter cake is formed in relatively short time. The cake contains a large amount of oil, complete removal of which involves considerable difficulty. For example, if, due to the peculiar nature of the stock, the wax is precipitated in an extremely voluminous form, thereby causing the formation of an extremely thick cake in a short time, then the resulting cake retains more oil and requires more washing. The wash solvent acts mainly as a liquid displacing medium, pushing the oil retained in the cake through the pores and interstices within the cake. Consequently, the thicker the cake the greater the time required for complete displacement of the retained oil.

There is a definite limit to the amount of washing that can be accomplished with a continuous rotary filter for a given speed of rotation. While reducing the speed of rotation permits longer washing time, it likewise increases the time for cake formation. Thus, with the type of oil in question a situation occurs where the filter cake formed is too thick to be washed effectively.

One factor which contributes to rapid cake formation is the depth of submergence of the filtering surface within the filtering mixture. The diameter of the rotary drum filters employed in dewaxing is around 8 or 10 feet. Thus, with 50 or 60% submergence of the drum in the filtering mixture, there is a static liquid head of some 5 or 6 feet, or perhaps more, which exerts a substantial pressure upon that portion of the filtering mixture immediately adjacent the submerged filter surface, even though the interior of the filter surface is at substantially atmospheric pressure. This static pressure, of course, increases to a maximum as the filter surface reaches the bottom of the filter bowl.

Consequently, when the filter surface nears the bottom of the filter bowl there is a substantial differential in pressure between the exterior and the interior of the filter surface. The greater this differential in pressure the more rapid is the rate of filtration.

With stocks from which the wax is precipitated in voluminous form, and which contain a large amount of wax, it is desirable to reduce the rate of cake formation so that the cake will not be too thick for effective washing with a rotary type of filter. In other words, it is desirable that the cake should not exceed about one-quarter inch in thickness.

The object of the present invention, therefore, is to reduce the amount of solids deposited upon the filter surface during submergence within the filtering mixture. This is accomplished by equalizing the pressure between the exterior and the interior of the filter surface during submergence in the chilled mixture of wax-bearing oil and dewaxing solvent liquid. In accordance with the present invention this pressure is equalized by continuously discharging the filtrate from the filter against a substantial static head of liquid, advantageously the filtrate itself. In this way there is maintained continually a plus liquid pressure within the interior of the submerged filter element. The presence of this plus liquid pressure thus impedes the rate of flow of filtrate through the filter surface. In this way the rate of filtration is controlled as is also the rate of deposition of solids upon the exterior of the submerged filter surface.

It is, of course, objectionable to reduce the depth to which the filter surface is submerged since, as will be explained later, this leads to difficulty in the subsequent washing of the filter cake. Thus, the present invention offers a means of controlling the thickness of the filter cake produced without reducing the level of the filtering mixture in the filter bowl and therefore without reducing the percentage of submergence.

In order to illustrate the invention more fully reference will now be made to the accompanying drawing.

The drawing represents a diagrammatic sectional view of a rotary drum filter. Thus, the filter comprises a bowl 1 into which the mixture to be filtered is introduced through a pipe 2.

Within the bowl is a horizontal drum 3 rotatably supported through its axis in the filter bowl. The axis comprises a hollow shaft terminating in the customary filter valve 4.

The cylindrical surface of the drum 3 is surrounded by a filter fabric in the conventional manner. The cylindrical portion of the drum is divided into a plurality of separate segmental sections, usually about 30 in number. Each of these segmental sections is connected by tubular means to the filter valve 4. In operation of the filter filtrate is drawn through the filter surface in each segmental section and from there through the connecting tubes to the filter valve 4 from which it is discharged through the pipes 5 and 6.

The solids are deposited in the form of a filter cake upon the outer surface of the filter fabric during its submergence in the filtering mixture. As the drum rotates the filter cake emerges from the filtering mixture, the surface of which may be maintained at a point such that around 50 to 60% of the filter drum 3 is submerged within the chilled mixture of wax-bearing oil and solvent undergoing filtration.

Upon emergence the filter cake is subjected to washing by a spray of wash solvent introduced through sprays 7 and 8 extending through the filter shell 9. Upon further rotation the filter cake is subjected to drying by the passage through it of flue gas or other inert gas, such gas being supplied to the interior of the filter shell by the pipe 10. Following this, the filter cake is discharged. This is accomplished by introducing a reverse pressure to the interior of the filter surface by means of gas introduced through a blow back line 11. In this way the filter fabric is distended and the cake removed therefrom by means of a knife or scraper 12 and is discharged into a trough 13 of a conveyor. This blow back also displaces liquid from the interior of the emergent portion of the filter element.

Upon further rotation the filter surface from which the cake has been removed submerges in the filtering mixture.

During operation the primary filtrate comprising dewaxed lubricating oil stock from which solidified wax has been removed is continuously discharged from the filter through the pipe 5. The wash filtrate introduced by the previously-mentioned sprays 7 and 8 passes through the filter cakes during their emergence and is discharged from the filter through the pipe 6 previously referred to, and by which means it is conducted to a wash filtrate receiver 15 which may be maintained under sub-atmospheric pressure by communication with a vacuum pump.

The wash filtrate is drawn off from the receiver 15 through a pipe 16.

The primary filtrate is conducted through the pipe 5 to a filtrate receiver 20 which may also be maintained under sub-atmospheric pressure through communication with a vacuum pump.

The filtrate is drawn off from the receiver 20 by a pump 21 and a portion thereof is conducted through a pipe 22 to a tank 23 provided with a return pipe 24 adapted to return the overflow liquid either to the filtrate receiver 20 or to the suction of the pump 21.

The tank 23 is connected by means of a pipe 25 to the previously-mentioned filtrate discharge pipe 5.

The tank 23 is placed so that the pipe 25 will be in a substantially vertical position and thereby provide means for providing a substantial head of liquid in the pipe 25 and the filtrate discharge pipe 5.

The elevation of the tank 23 or the depth of liquid therein may be varied depending upon the extent of the liquid head which it is desired to maintain in the filtrate discharge system. Thus, the tank may be maintained at a level approximately the same or somewhat above the surface level of the mixture of wax-bearing oil in the filter bowl. It may be placed at a somewhat lower level but generally it is preferred to maintain the tank in a position so that the static liquid head in the filtrate discharge pipes will be at least equivalent to the depth of the liquid in the filter bowl, thereby substantially equalizing the pressure through the filter surface during submergence.

It is advantageous to employ a tank 23 having a plurality of valve controlled overflow outlets at different levels emptying into the return pipe 24 since this affords a means of providing a constant liquid head of cold filtrate of desired elevation on the filtrate discharge from the filter. It is, of course, contemplated that other means of providing a substantially constant liquid head may be employed as, for example, a vertical loop in the filtrate discharge pipe having provision therein to prevent any siphoning action.

The tank 23 is provided with a gas vent 26 through which gas displaced from the submerged filter element may be vented.

As indicated in the drawing the surplus primary filtrate accumulating in the receiver 20 may be drawn off through a pipe 27.

It was indicated at the outset that the object of the present invention was to provide a means of controlling cake formation without reducing the depth of submergence. In other words, the filter could be operated by maintaining the filter drum submerged in filtering mixture to a depth corresponding to 50 or 60% of its diameter. It was indicated that reducing the liquid level in the filter bowl is objectionable, due to difficulty encountered in washing the filter cake.

Referring to the drawing it will be seen that if the liquid level is maintained at a point below the axis of the rotary drum there is a substantial lapse of time between the point at which the filter cake emerges from the surface of the filtering mixture and that at which it comes into direct contact with the solvent wash issuing from the spray 7. During such lapse of time filtration, of course, continues, due to the vacuum being exerted upon the exposed filter cake. As a result, liquid retained in the cake as it leaves the filtering mixture is drawn into the interior of the filter element. This causes the cake to develop cracks so that when it finally comes into contact with the wash solvent the solvent short-circuits through the cracks. Effective washing of the cake is thus not realized. It is therefore desirable to bring the filter cake into contact with the wash solvent just as soon as possible after the cake emerges from the filtering mixture. This can be accomplished when the surface of the filtering mixture is maintained at a high level in the filter bowl.

As previously explained, the invention has particular application in the dewaxing of lubricating oil stocks containing relatively large amounts of wax, and which wax is precipitated in voluminous and bulky form.

In actual operation the lubricating oil stock is mixed with a dewaxing solvent liquid advantageously of the selective type, such as a mixture of methyl ethyl ketone and commercial benzol containing around 40 to 50% of ketone. This solvent mixture is usually mixed with the oil in the proportion of about two to four parts of solvent and one of the oil.

The mixture is chilled to dewaxing temperature of around 0° F. to minus 20° F. The resulting chilled mixture is then introduced to the bowl of a continuous filter, such as described above, and filtered to remove the solidified wax hydrocarbons.

It is also contemplated that the invention may be applied to the de-oiling of waxy concentrates such as the slack wax produced in a conventional dewaxing operation.

While the invention has been described as having particular application to a vacuum type of continuous filter operation it is contemplated that it may also be applicable to pressure filter operations.

Obviously many modifications and variations of the invention, as hereinbefore set forth, may be made without departing from the spirit and scope thereof, and therefore only such limitations should be imposed as are indicated in the appended claims.

I claim:

1. In the process of dewaxing mineral oil from which wax is precipitated in voluminous form by continuously filtering a mixture of wax-bearing oil and normally liquid dewaxing solvent chilled to a temperature sufficiently low to solidify wax constituents of the oil and wherein a rotating filtering surface consecutively submerges within the chilled mixture contained in a filter bowl during which formation of a wax cake occurs with production and continuous discharge of a filtrate, and then emerges from the chilled mixture during which said cake is washed, dried and discharged therefrom, the method of controlling cake formation which comprises continuously discharging the filtrate of dewaxed oil and normally liquid dewaxing solvent from the filter against a substantial static head of liquid sufficient to maintain a predetermined substantial plus pressure of liquid within the filter element during the entire time that it is submerged in the chilled mixture thereby positively controlling flow of filtrate through the filter surface and deposition of solids upon the filter surface, said predetermined pressure being at least equivalent to the depth of the liquid in the filter bowl.

2. The method according to claim 1 in which the static head of liquid comprises filtrate.

3. The method according to claim 1 in which the static head of liquid is substantially equivalent to the depth of chilled mixture in the filter bowl.

4. In the process of dewaxing mineral oil from which wax is precipitated in voluminous form by continuously filtering the wax-bearing mixture chilled to a temperature sufficiently low to solidify wax constituents of the oil and wherein a hollow rotating filtering element consecutively submerges within the chilled mixture contained in a filter bowl during which submergence formation of a wax cake occurs on the exterior of the element and filtrate flows into the interior of the element from which it is continuously discharged, and then emerges from the chilled mixture during which said cake is washed, dried and discharged therefrom, the method of controlling cake formation which comprises maintaining the interior of the filter element substantially completely filled with filtrate throughout the entire period of submergence, and continuously discharging the filtrate from the filter against a substantial plus liquid pressure such that the thickness of the cake formed upon the filter surface is positively controlled.

HOWARD H. GROSS.